United States Patent
Ippommatsu et al.

(10) Patent No.: US 6,864,204 B2
(45) Date of Patent: *Mar. 8, 2005

(54) FUEL ELECTRODE FOR SOLID ELECTROLYTE FUEL CELLS AND A METHOD FOR MANUFACTURE OF THE ELECTRODE

(75) Inventors: Masamichi Ippommatsu, Nishinomiya (JP); Minoru Suzuki, Suita (JP); Hirokazu Sasaki, Toyonaka (JP); Shoji Otoshi, Sakai (JP); Hisao Ohnishi, Osaka (JP)

(73) Assignee: Osaka Gas Company Limited, Osaka (JP)

( * ) Notice: Subject to any disclaimer, the term of this patent is extended or adjusted under 35 U.S.C. 154(b) by 48 days.

This patent is subject to a terminal disclaimer.

(21) Appl. No.: 10/200,992

(22) Filed: Jul. 23, 2002

(65) Prior Publication Data

US 2002/0192534 A1 Dec. 19, 2002

Related U.S. Application Data

(60) Continuation of application No. 09/557,511, filed on Apr. 25, 2000, now Pat. No. 6,432,570, which is a continuation of application No. 08/748,120, filed on Nov. 12, 1996, now Pat. No. 6,054,232, which is a continuation of application No. 08/532,317, filed on Sep. 20, 1995, now abandoned, which is a continuation of application No. 08/340,963, filed on Nov. 17, 1994, now abandoned, which is a continuation of application No. 08/195,420, filed on Feb. 14, 1994, now abandoned, which is a division of application No. 07/650,138, filed on Feb. 4, 1991, now Pat. No. 5,286,580.

(30) Foreign Application Priority Data

Feb. 9, 1990 (JP) .............................................. 2-30224

(51) Int. Cl.$^7$ .............................................. H01M 4/88
(52) U.S. Cl. ..................... 502/101; 29/623.1; 29/623.5; 427/115; 427/372.2; 427/376.6
(58) Field of Search .............................. 429/40, 42, 44, 429/45; 427/115, 372.2, 376.6; 29/623.5, 623.1; 502/101

(56) References Cited

U.S. PATENT DOCUMENTS

| | | | | |
|---|---|---|---|---|
| 5,286,580 A | * | 2/1994 | Ippommatsu et al. | ......... 429/40 |
| 6,054,232 A | * | 4/2000 | Ippommatsu et al. | ......... 429/40 |
| 6,432,570 B1 | * | 8/2002 | Ippommatsu et al. | ......... 429/40 |

* cited by examiner

*Primary Examiner*—Bruce F. Bell
(74) *Attorney, Agent, or Firm*—Jordan and Hamburg LLP

(57) ABSTRACT

The invention relates to a fuel electrode for high-temperature solid electrolyte fuel cells and a process for manufacture of the electrode. The fuel electrode of the invention is a porous element composed of a high-melting metal, such as ruthenium, osmium, rhodium or iridium, or an alloy containing the metal. The process for manufacture of the fuel electrode comprises coating an electrode material with a solution or dispersion of the high-melting metal and/or its chloride, sintering the same and finally reducing the product.

5 Claims, No Drawings

FUEL ELECTRODE FOR SOLID ELECTROLYTE FUEL CELLS AND A METHOD FOR MANUFACTURE OF THE ELECTRODE

This is a Continuation of application Ser. No. 09/557,511 filed Apr. 25, 2000, now U.S. Pat. No. 6,432,570, which is a Continuation of 08/748,120 filed Nov. 12, 1996, now Issued U.S. Pat. No. 6,054,232, which is a Continuation of 08/532,317 filed Sep. 20, 1995, now Abandoned, which is a Continuation of 08/340,963 filed Nov. 17, 1994, now Abandoned, which is a Continuation of 08/195,420 filed Feb. 14, 1994, now Abandoned, which is a Divisional of 07/650,138 filed Feb. 4, 1991, now Issued U.S. Pat. No. 5,286,580.

BACKGROUND OF THE INVENTION

The present invention relates to a fuel electrode for high-temperature solid electrolyte fuel cells and a method of manufacturing the electrode.

Heretofore, nickel/zirconia ($Ni/ZrO_2$) cermets have been employed for fuel electrodes in commercialized high-temperature solid electrolyte fuel cells.

These $Ni/ZrO_2$ cermets are typically produced by the below alternative processes.

(1) A process in which $NiO/ZrO_2$ is sintered and then reduced to provide a $Ni/ZrO_2$ cermet, (e.g. the Ceramatec process described in Proceedings of SOFC-NAGOYA, p.24); and (2) A process, known as the Westinghouse process, in which $ZrO_2$ in a crude $Ni/ZrO_2$ cermet is caused to grow into spaces between Ni grains by the EVD technique, (Japanese Kokai Patent Publication No. 61-153280).

Aside from the above, porous platinum (Pt) materials obtainable by sintering platinum pastes have been used in $ZrO_2$ sensors and the like or in basic research.

However, the $Ni/ZrO_2$ cermet electrode manufactured by the first-mentioned process is disadvantageous in that when the fuel cell is run over thousands of hours at temperatures near 1,000° C., the Ni grains therein are sintered thus degrading the electrode and ultimately causing exfoliation of the electrode. Increasing the proportion of $ZrO_2$ to avoid this sintering detracts from the performance of the electrode.

The $Ni/ZrO_2$ cermet manufactured by the second process is resistant to sintering and insures a satisfactory electrode performance, but, since it involves an EVD step, the overall manufacturing process is complicated and the cost of manufacture is increased.

The porous platinum electrode is disadvantageous in that the platinum reacts with the impure metal in the fuel and is vaporized in a continuous operation in a reducing atmosphere resulting in early aging of the electrode. Furthermore, platinum is an expensive metal and the manufacture of porous platinum electrodes is costly.

SUMMARY OF THE INVENTION

The object of the present invention is to overcome the above disadvantages and provide an improved fuel electrode which does not undergo sintering or aging even when the fuel cell is operated continuously for a long time at a high temperature and a simple method of manufacturing the electrode.

The fuel electrode of the invention for high-temperature solid electrolyte fuel cells is characterized in that it is a porous element composed of a high melting point metal having a melting point of not less than 1,900° C. or an alloy containing such a high melting point metal.

As species of the high melting point metal with a melting point of not less than 1,900° C., there may be mentioned ruthenium (Ru), osmium (Os), rhodium (Rh) and iridium (Ir).

As apparent from the melting points presented below, Ru, Os, Rh and Ir melt at higher temperatures than Ni and Pt and are more resistant to sintering. Because they are highly resistant to sintering, ceramification is not required. Furthermore, since the resistance to sintering is high, it is feasible to design a system with a long interfacial dimension of the three-phase zone of $ZrO_2$/Metal/Gas (if such a structure is designed with Ni, sintering soon occurs) and thereby reduce all the reaction polarization, diffusion polarization and resistance polarization of the electrode.

| Melting Points | |
|---|---|
| Ni | 1453° C. |
| Pt | 1769° C. |
| Ru | 2500° C. |
| Rh | 1960° C. |
| Ir | 2443° C. |
| Os | 2700° C. |

Of the above-mentioned metals, Ru is the most advantageous in that it has:

(1) a high melting point and stability even in a reducing atmosphere;

(2) a low cost; and (3) a high catalyst activity for steam reforming of $CH_4$ which is an important factor in electrode performance.

Osmium (Os) is also useful but in view of the high vapor pressure of $OsO_4$ and its high toxicity, it is somewhat disadvantageous for commercial use as compared with Ru.

The fuel electrode of the present invention for high-temperature solid electrolyte fuel cells can be manufactured by dissolving or dispersing a powder of at least one of Ru, Os, Rh and Ir or at least one of ruthenium chloride, osmium chloride, rhodium chloride and iridium chloride in an organic solvent or water, coating an electrode material with the resulting solution or dispersion, sintering the same and finally reducing it. It should be understood that the powdery metal and metal chloride can be used in combination with each other.

The sintering operation is preferably conducted in an oxidizing atmosphere at a temperature of 400 to 1,000° C. and the reduction reaction is preferably conducted at a temperature of 500 to 1,300° C.

Preferably the reduction is conducted in a reducing atmosphere, particularly in a hydrogen ($H_2$) atmosphere.

The organic solvent to be used is preferably a low-boiling point solvent and more desirably an alcohol of 1 to 6 carbon atoms. The most advantageous alcohols are propanol and butanol.

In terms of the ease of porosity control and handling, it is good practice to employ a high molecular weight compound soluble in the organic solvent or in water. Among such high molecular weight compounds are polybutyl alcohol, polyvinyl alcohol and methylcellulose.

Compared with the conventional $Ni/ZrO_2$ cermet electrode, the electrode according to the present invention has the following meritorious characteristics:

(1) Substantially no sintering occurs even when the fuel cell is run for thousands of hours at 1,000° C.; and (2) Each of the reaction, diffusion and resistance polarization values are as small as several mV at 500 mA/cm$^2$.

Particularly when Ru is employed, not only an excellent electrode performance is ensured but also the manufacturing cost is kept down resulting in profitable commercial application.

Furthermore, since the manufacturing method according to the present invention is a simple process comprising coating an electrode material with an aqueous or organic solution or dispersion of a powdery high melting point metal and/or a high melting point metal chloride, sintering the same, and then reducing it, the manufacturing process is simple and the cost of manufacture is low. Moreover, the concomitant use of a high molecular weight compound soluble in the organic solvent or water facilitates porosity control and handling.

DESCRIPTION OF THE PREFERRED EMBODIMENTS

The following examples and comparative examples are intended to illustrate the invention in further detail and should by no means be construed as defining the metes and bounds of the invention.

EXAMPLE 1

In 89 parts by weight of n-butanol were dissolved 10 parts by weight of hydrous ruthenium trichloride (RuCl$_3$.3H$_2$O) and 1 part by weight of polybutyl alcohol, and pellets (2 cm in diameter and 0.2 mm thick) of yttria-doped zirconia (ZrO$_2$ containing 8 mol % of Y$_2$O$_3$; hereinafter referred to as YSZ) were coated with the resulting solution. The coated pellets were heated in air at 850° C., and then reduced in a H$_2$ atmosphere at 1,000° C. to provide a porous electrode having a thickness of 50 μm. Using this as the fuel electrode, a fuel cell was fabricated and a fuel gas composed of 90 vol. % of H$_2$ and 10 vol. % of H$_2$O and air were passed to the fuel electrode and an air electrode, respectively, to investigate the polarization characteristics at 200 mA/cm$^2$. As a result, all the reaction, diffusion and resistance polarization values were not larger than 5 mV. The same fuel electrode was maintained in H$_2$ streams at 1,000° C. for 1,315 hours and similar determinations were made. As a result, no significant difference was found in any of these parameter values.

EXAMPLE 2

To 30 parts by weight of a 5% aqueous solution of polyvinyl alcohol were added 70 parts by weight of powdery ruthenium metal (particle size 1 to 5 μm) followed by thorough mixing. Then, YSZ pellets were coated with the resulting slurry. The coated pellets were heated in the air at 500° C. (for removal of the binder), and then were reduced in streams of a gas composed of 5 vol. % of H$_2$ and 95 vol. % of N$_2$ at 1,050° C. to provide a porous electrode having a thickness of 50 μm. The performance of this electrode was comparable to that of the electrode obtained in Example 1.

EXAMPLE 3

In 89 parts by weight of water were dissolved 10 parts by weight of hydrous ruthenium trichloride and 1 part by weight of polyvinyl alcohol. YSZ pellets were coated with the resulting solution and, thereafter, the procedure described in Example 2 was repeated to provide an electrode. The performance of this electrode was comparable to that of the electrode obtained in Example 1.

EXAMPLE 4

In 35 parts by weight of a 5% aqueous solution of polyvinyl alcohol were dissolved 3 parts by weight of ruthenium chloride followed by the addition of 62 parts by weight of powdery ruthenium metal to prepare a slurry. YSZ pellets were coated with the above slurry and the coated pellets were dried at room temperature and heated in the air at 500° C. Then, the pellets were reduced in streams of a gas composed of 5 vol. % of H$_2$ and 95 vol. % of N$_2$ at 1,050° C. The characteristics of the resulting electrode which was about 50 μm thick were similar to those of the electrode obtained in Example 1.

COMPARATIVE EXAMPLE 1

A 70 weight % suspension of powdery NiO plus powdery YSZ (NiO:YSZ=6:4, w/w) in ethanol was used to coat the same YSZ pellets as used in Example 1. The coated pellets were sintered in the air at 1,300° C. and, then, reduced in a hydrogen stream at 1,000° C. to provide a Ni/ZrO$_2$ cermet electrode. This electrode was tested for various parameters as in Example 1. As a result, the sum of reaction polarization and diffusion polarization values at 500 mA/cm$^2$ was 30–100 mV. When the same electrode was maintained in a stream of H$_2$ at 1,000° C. for 1,050 hours, extensive exfoliation took place.

What is claimed is:

1. A process for manufacturing a fuel electrode comprising:
   dissolving or dispersing at least one member of the group consisting of ruthenium, osmium, rhodium, iridium, ruthenium chloride, osmium chloride, rhodium chloride, and iridium chloride, in an organic solvent or water;
   coating an electrode material with the resulting solution or dispersion;
   sintering the coated electrode at a temperature of 400 to 1,000° C.; and
   reducing the sintered coated electrode at a temperature of 500 to 1,300° C.

2. The process according to claim 1, wherein said organic solvent is an alcohol of 1 to 6 carbon atoms.

3. The process according to claim 2, further comprising use of a high molecular weight compound soluble in the alcohol.

4. The process according to claim 1, further comprising use of a high molecular weight compound soluble in water.

5. The process according to claim 4, wherein said high molecular weight compound is polyvinyl alcohol.

* * * * *